US007116246B2

(12) United States Patent
Winter et al.

(10) Patent No.: US 7,116,246 B2
(45) Date of Patent: Oct. 3, 2006

(54) APPARATUS AND METHOD FOR SENSING THE OCCUPANCY STATUS OF PARKING SPACES IN A PARKING LOT

(76) Inventors: MaryAnn Winter, 5411 Amberwood La., Rockville, MD (US) 20853; Josef Osterweil, 5411 Amberwood La., Rockville, MD (US) 20853

( * ) Notice: Subject to any disclaimer, the term of this patent is extended or adjusted under 35 U.S.C. 154(b) by 313 days.

(21) Appl. No.: 10/490,115

(22) PCT Filed: Oct. 10, 2002

(86) PCT No.: PCT/US02/29826

§ 371 (c)(1),
(2), (4) Date: Mar. 26, 2004

(87) PCT Pub. No.: WO03/029046

PCT Pub. Date: Apr. 10, 2003

(65) Prior Publication Data

US 2005/0002544 A1 Jan. 6, 2005

Related U.S. Application Data

(60) Provisional application No. 60/326,444, filed on Oct. 3, 2001.

(51) Int. Cl.
*B60Q 1/48* (2006.01)

(52) U.S. Cl. .................................... 340/932.2; 348/148

(58) Field of Classification Search ............ 340/932.2, 340/937, 933; 348/143, 148, 149, 159
See application file for complete search history.

(56) References Cited

U.S. PATENT DOCUMENTS

| | | | | |
|---|---|---|---|---|
| 5,910,817 | A * | 6/1999 | Ohashi et al. | 348/159 |
| 6,107,942 | A * | 8/2000 | Yoo et al. | 340/932.2 |
| 6,285,297 | B1 * | 9/2001 | Ball | 340/932.2 |
| 6,340,935 | B1 | 1/2002 | Ball | |
| 6,426,708 | B1 * | 7/2002 | Trajkovic et al. | 340/932.2 |

* cited by examiner

*Primary Examiner*—Brent A. Swarthout

(57) ABSTRACT

Method and apparatus for analyzing a status of an object in a predetermined area of a parking lot facility having a plurality of parking spaces. A distinctive marking is projected into at least one predetermined area. An image of the predetermined area, that may include one or more objects, is captured. A three-dimensional model is produced from the captured image. A test is then performed on the produced model to determine an occupancy status of at least one parking space in the predetermined area. An indicating device provides information regarding the determined occupancy status.

24 Claims, 9 Drawing Sheets

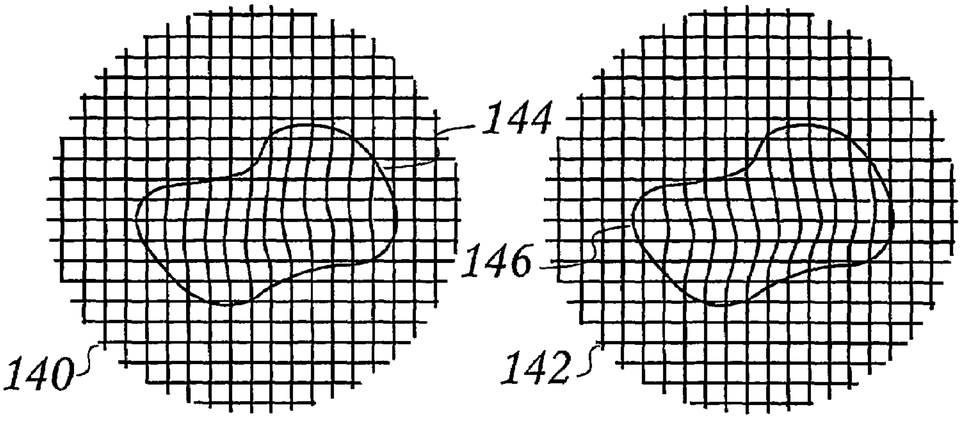
Fig. 8(a)
Fig. 8(b)
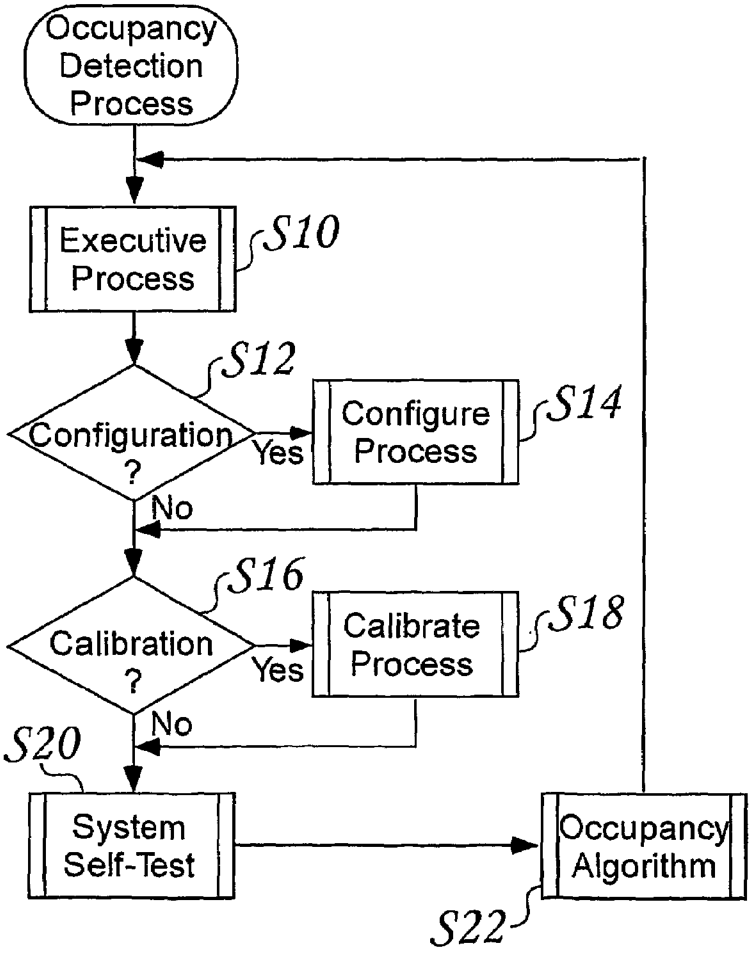
Fig. 9

APPARATUS AND METHOD FOR SENSING THE OCCUPANCY STATUS OF PARKING SPACES IN A PARKING LOT

RELATED DATA

The present application expressly incorporates by reference herein the entire disclosure of U.S. Provisional Application No. 60/326,444, entitled "Apparatus and Method for Sensing the Occupation Status of Parking Spaces In a Parking Lot", which was filed on Oct. 3, 2001.

FIELD OF THE INVENTION

The present invention is directed to an apparatus and method for determining the location of available parking spaces and/or unavailable parking spaces in a parking lot (facility). The present invention relates more specifically to an optical apparatus and a method for using the optical apparatus that enables an individual and/or the attending personnel attempting to park a vehicle in the parking lot to determine the location of all unoccupied parking locations in the parking lot.

BACKGROUND AND RELATED INFORMATION

Individuals that are attempting to park their vehicle in a parking lot often have to search for an unoccupied parking space. In a large public parking lot without preassigned parking spaces, such a search is time consuming, harmful to the ecology, and often frustrating.

As a result, a need exists for an automated system that determines the availability of parking lots in the parking lot and displays them in a manner visible to the driver. Systems developed to date require sensors (i.e., ultrasonic, mechanical, inductive, and optical) to be distributed throughout the parking lot with respect to every parking space. These sensors have to be removed and reinstalled each time major parking lot maintenance or renovation is undertaken.

Typically, the vehicles in a parking lot are of a large variety of models and sizes. The vehicles are randomly parked in given parking spaces and the correlation between given vehicles and given parking spaces changes regularly. Further, It is not uncommon for other objects, such as, but not limited to, for example, construction equipment and/or supplies, dumpsters, snow plowed into a heap, and delivery crates to be located in a location normally reserved for a vehicle. Moreover, the images of all parking spaces change as a function of light condition within a 24 hour cycle and from one day to the next. Changes in weather conditions, such as wet pavement or snow cover, will further complicate the occupancy determination and decrease the reliability of such a system.

SUMMARY OF THE INVENTION

Accordingly, an object of the present invention is to reliably and accurately determine the status of at least one parking space in a parking lot (facility). The present invention is easily installed and operated and is most suitable to large open space or outdoor parking lots. According to the present invention, a digital three-dimensional model of a given parking lot is mapped (e.g. an identification procedure is performed) to accurately determine parking space locations where parking spaces are occupied and where parking spaces are not occupied (e.g the status of the parking space) at a predetermined time period. A capture device produces data representing an image of an object. A processing device processes the data to derive a three-dimensional model of the parking lot, which is stored in a database. A reporting device, such as, for example, an occupancy display, indicates the parking space availability. The processing device determines a change in at least one specific property by comparing the three-dimensional model with at least one previously derived three-dimensional model stored in the database. It is understood that a synchronized image capture is a substantially concurrent capture of an image. The degree of synchronization of image capture influences the accuracy of the three-dimensional model when changes are introduced at the scene as a function of time. Additionally, the present invention has the capability of providing information that assists in the management of the parking lot such as, but not limited to, for example, adjusting the number of handicapped spaces, based on the need for such parking spaces over time and adjusting the number and adjusting the frequency of shuttle bus service based on the number of passengers waiting for a shuttle bus. It is noted that utility of handicapped parking spaces is effective when, for example, a predetermined percentage of unoccupied handicapped parking spaces are available for new arrivals.

According to an advantage of the invention, the capture device includes, for example, an electronic camera set with stereoscopic features, or plural cameras, or a scanner, or a camera in conjunction with a spatially offset directional illuminator, a moving capture device in conjunction with synthetic aperture analysis, or any other capture device that captures space diverse views of objects, or polar capture device (direction and distance from a single viewpoint) for deriving a three-dimensional representation of the objects including RADAR, LIDAR, or LADAR direction controlled range-finders or three-dimensional imaging sensors (one such device was announced by Canesta, Inc.). It is noted that image capture includes at least one of static image capture and dynamic image capture where dynamic image is derived from the motion of the object using successive captured image frames.

According to a feature of the invention, the capture device includes a memory to store the captured image. Accordingly, the stored captured image may be analyzed by the processing device in near real-time; that is shortly after the image was captured. An interface is provided to selectively connect at least one capture device to at least one processing device to enable each segment of the parking lot to be sequentially scanned. The image data remains current providing the time interval between successive scans is relatively short, such as, but not limited to, for example, less than one second.

According to another feature of the invention, the data representing an image includes information related to at least one of color, and texture of the parking lot and the objects therein. This data may be stored in the database and is correlated with selected information, such as, for example, at least one of parking space identification by number, row, section, and the date the data representing the image of the object was produced, and the time the data representing the image of the object was produced.

A still further feature of the invention is the inclusion of a pattern generator that projects a predetermined pattern onto the parking lot and the objects therein. The predetermined pattern projected by the pattern generator may be, for example, a grid pattern, and/or a plurality of geometric shapes.

According to another object of the invention, a method is disclosed for measuring and/or characterizing selected parking spaces of the parking lot. The method produces data that represents an image of an object and processes the data to derive a three-dimensional model of the parking lot which is stored in a database. The data indicates at least one specific property of the selected parking space of the parking lot, wherein a change in at least one specific property is determined by comparing at predetermined time intervals the three-dimensional model with at least one previously derived three-dimensional model stored in the database.

According to an advantage of the present invention, a method of image capture and derivation of a three-dimensional image by stereoscopic triangulation using spatially diverse at least one of an image capture device and a directional illumination device, by polar analysis using directional ranging devices, or by synthetic aperture analysis using a moving capture device. It is noted that image capture includes at least one of static image capture and dynamic image capture where dynamic image is derived from the motion of the object using successive captured image frames.

According to a further advantage of this method, the captured image is stored in memory, so that, for example, it is processed in near real-time, that is predetermined time after the image was captured; and/or at a location remote from where the image was captured.

According to a still further object of the invention, a method is disclosed for characterizing features of an object, in which an initial image view is transformed to a two-dimensional physical perspective representation of an image corresponding to the object. The unique features of the two-dimensional perspective representation of the image are identified. The identified unique features are correlated to produce a three-dimensional physical representation of all uniquely-identified features and three-dimensional characteristic features of the object are determined.

A still further object of the invention comprises an apparatus for measuring and/or characterizing features of an object, comprising an imaging device that captures a two-dimensional image of the object and a processing device that processes the captured image to produce a three-dimensional representation of the object. The three-dimensional representation includes parameters indicating a predetermined feature of the object. The apparatus also comprises a database that stores the parameters and a comparing device that compares the stored parameters to previously stored parameters related to the monitored space to determine a change in the three-dimensional representation of the monitored space. The apparatus also comprises a reporting/display device that uses results of the comparison by the comparing device to generate a report pertaining to a change in the monitored space.

BRIEF DESCRIPTION OF THE DRAWINGS

The foregoing and other objects, features and advantages of the invention will be apparent from the following more particular description of preferred embodiments, as illustrated in the accompanying drawings which are presented as a non-limiting example, in which reference characters refer to the same parts throughout the various views, and wherein:

FIGS. 8(*a*) and 8(*b*) represent left and right images, respectively, that were imaged with the apparatus of the second embodiment;

FIG. 9 illustrates an example of a parking space occupancy routine according to the present invention;

DETAILED DISCLOSURE OF THE INVENTION

The particulars shown herein are by way of example and for purposes of illustrative discussion of embodiments of the present invention only and are presented in the cause of providing what is believed to be a most useful and readily understood description of the principles and conceptual aspects of the present invention. In this regard, no attempt is made to show structural details of the present invention in more detail than is necessary for the fundamental understanding of the present invention, the description taken with the drawings make it apparent to those skilled in the art how the present invention may be embodied in practice.

According to the present invention, an image of an area to be monitored, such as, but not limited to, for example, part of a parking lot 5 (predetermined area) is obtained, and the obtained image is processed to determine features of the predetermined area (status), such as, but not limited to, for example, a parked vehicle 4 and/or person within the predetermined area.

Figure 1:
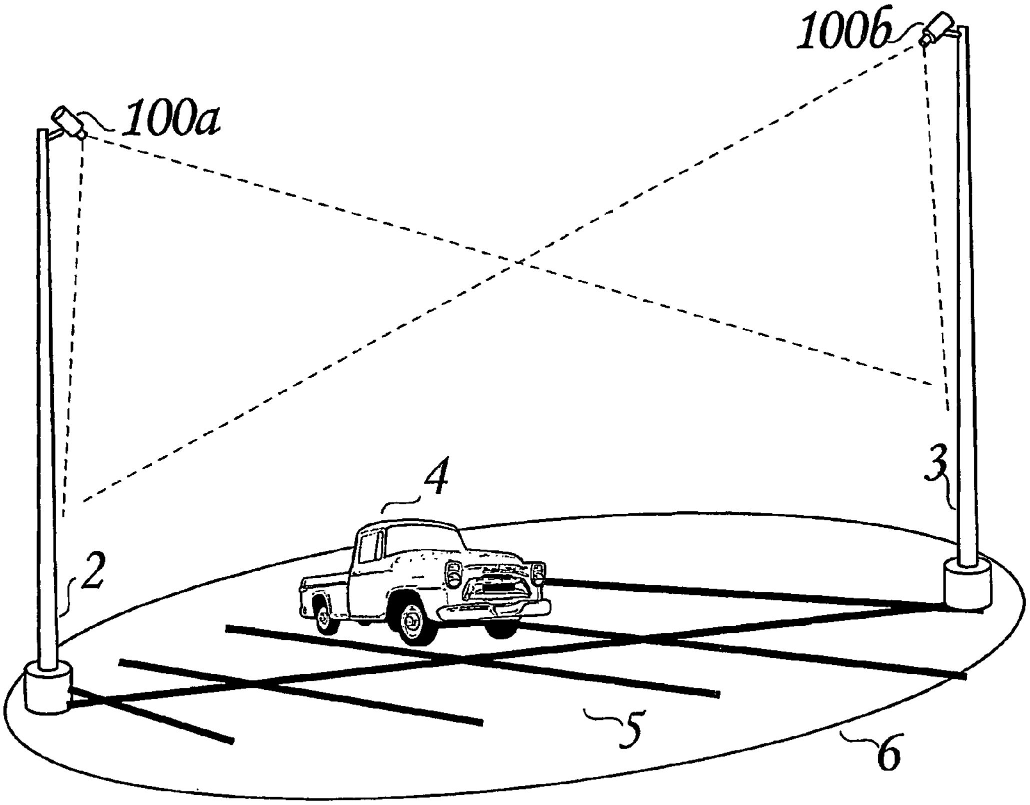
FIG. 1 illustrates a first embodiment of an apparatus for analyzing the presence or absence of objects on parking spaces of a parking lot.

FIG. 1 illustrates an embodiment of the current invention. As shown in FIG. 1, two cameras 100*a* and 100*b* act as a stereoscopic camera system. Suitable cameras include, but are not limited to, for example, an electronic or digital camera that operates to capture space diverse views of objects, such as, but not limited to, for example, the parking lot 5 and the vehicle 4. In the disclosed embodiment, the cameras 100*a* and 100*b* for obtaining stereoscopic images by triangulation are shown. In this regard, while a limited number of camera setups will be described herein, it is understood that other (non-disclosed) setups may be equally acceptable and are not precluded by the present invention.

While the disclosed embodiment utilizes two cameras, it is understood that a similar stereoscopic triangulation effect can be obtained by multiple spatially-offset cameras to capture multiple views of an image. It is further understood that a stereoscopic triangulation can be obtained by any capture device that captures space diverse views of the parking lot and the objects therein. Furthermore, the present invention employing a single stationary capture device in conjunction with, but not limited to, for example, a spatially offset direction controllable illuminator to obtain the stereoscopic triangulation effect. It is further understood that a polar-sensing device (sensing distance and direction) for deriving a three-dimensional representation of the objects in the parking lot including direction-controlled range-finder or three-dimensional imaging sensor (such as, for example, manufactured by Canesta Inc.) may be used without departing from the spirit and /or scope of the present invention.

In the disclosed embodiment, the cameras 100*a* and 100*b* comprise a charge-couple device (CCD) sensor or a CMOS sensor. Such sensors are well know to those skilled in the art, and thus, a discussion of their construction is omitted herein. In the disclosed embodiments, the sensor comprises, for example, a two-dimensional scanning line sensor or matrix sensor. However, it is understood that other types of sensors may be employed without departing from the scope and/or spirit of the instant invention. In addition, it is understood that the present invention is not limited to the particular camera construction or type described herein. For example, a digital still camera, a video camera, a camcorder, or any other electrical, optical, or acoustical device that records (collects) information (data) for subsequent three-dimensional processing may be used. In addition, a single sensor may be used when an optical element is applied to provide space diversity (for example, a periscope) on a common CCD sensor and where each of the two images are captured by respective halves of the CCD sensor to provide the data for stereoscopic processing.

Further, it is understood that the image (or images) captured by the camera (or cameras) can be processed substantially "in real time" (e.g., at the time of capturing the image(s)), or stored in, for example, a memory, for delayed processing, without departing from the spirit and/or scope of the invention.

A location of the cameras 100*a* and 100*b* relative to the vehicle 4, and in particular, a distance (representing a spatial diversity) between the cameras 100*a* and 100*b* determines the effectiveness of a stereoscopic analysis of the object 4 and the parking lot 5. For purpose of illustration, dotted lines in FIG. 1 depict the optical viewing angle of each camera. Since the cameras 100*a* and 100*b* provide for the capturing of a stereoscopic image, two distinct images fall upon the cameras' sensors.

Each image captured by the cameras 100*a* and 100*b* and their respective sensors are converted to electrical signals having a format that can be utilized by an appropriate image processing device (e.g., a computer 25 shown in FIG. 2, that executes an appropriate image processing routine), so as to, for example, process the captured image, analyze data associated with the captured image, and produce a report related to the analysis.

Figure 2:
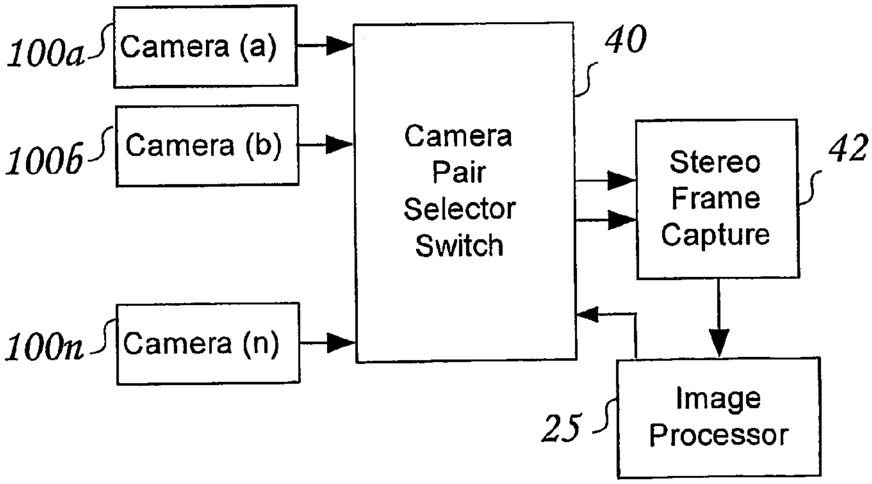
FIG. 2 illustrates a multi-sensor image processing arrangement according to the present invention.
Figure 3:
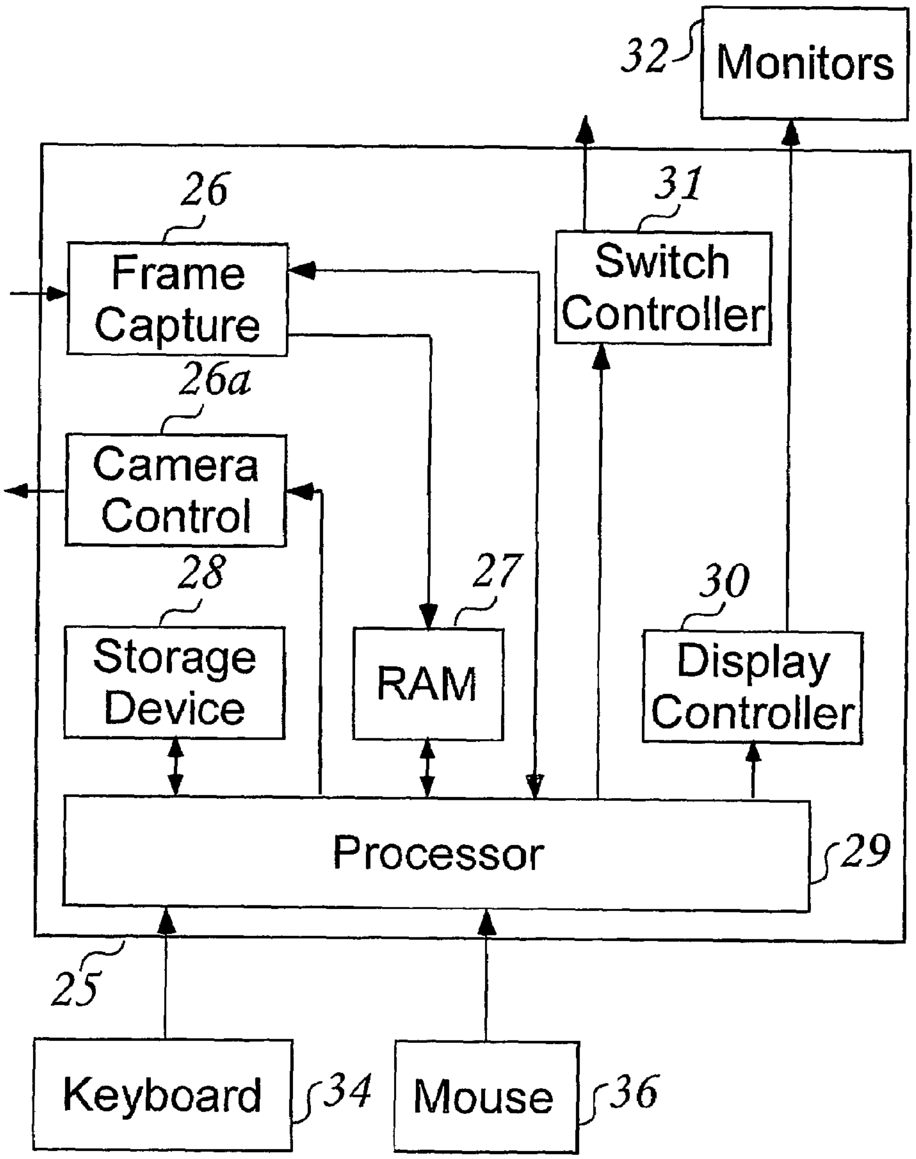
FIG. 3 illustrates an example of a processing device of the present invention.
Figure 4A:
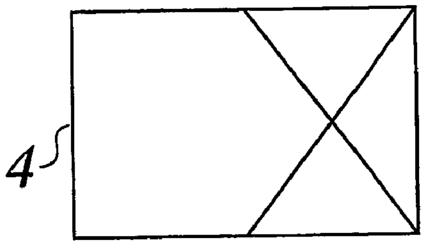
FIGS. 4(*a*) to 4(*e*) illustrate optical image transformations produced by the invention of FIG. 1.
Figure 4B:
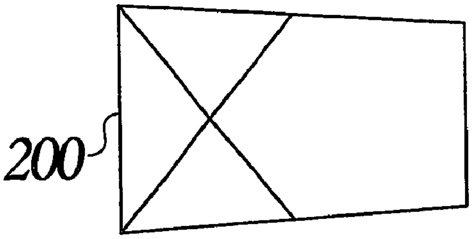
Figure 4C:
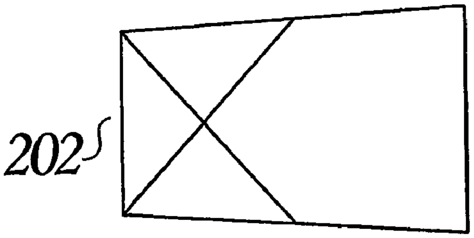
Figure 4D:
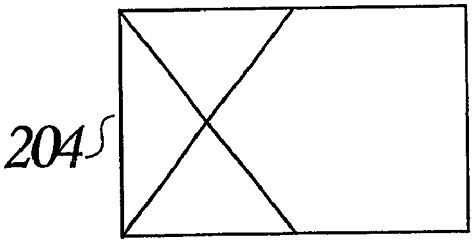
Figure 4E:
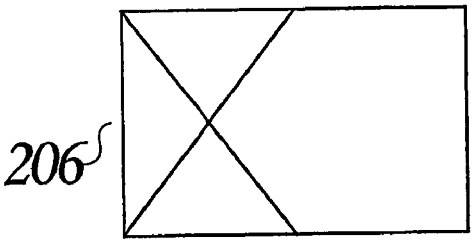

As seen in FIG. 2, a selector switch 40 enables selection of two cameras from among a plurality of cameras that are dispersed over the parking lot 5 to provide complementary images suitable for stereoscopic analysis. In the disclosed embodiment, the two obtained images are transformed by an external frame capture device 42. Alternately, the image processor (e.g. computer) 25 may employ an internal frame capture 26 (FIG. 3) may be used. The frame capture (grabber) converts to a format recognizable by the computer 25 and its processor 29 (FIG. 3). However, it is understood that a digital or analog bus for collecting image data from a selected pair of cameras, instead of the selector switch or other image data conveyances, can be used without departing from the spirit and/or scope of the invention.

FIG. 3 illustrates hi greater detail the computer 25, including internal and external accessories, such as, but not limited to, a frame capture device 26, a camera controller 26*a*, a storage device 28, a memory (e.g., RAM) 27, a display controller 30, a switch controller 31 (for controlling selector switch 40), at least one monitor 32, a keyboard 34 and a mouse 36. However, it is understood that multiple computers and/or different computer architecture can be used without departing from the spirit and/or scope of the invention.

The computer 25 employed with the present invention comprises, for example, a personal computer based on an Intel microprocessor 29, such as, for example, a Pentium III microprocessor (or compatible processor, such as, for example, an Athlon processor manufactured by AMD), and utilizes the Windows operating system produced by Microsoft Corporation. The construction of such computers is well known to those skilled in the art, and hence, a detailed description is omitted herein. However, it is understood that computers utilizing alternative processors and operating systems, such as, but not limited to, for example, an Apple Computer or a Sun computer, may be used without departing from the scope and/or spirit of the invention. It is understood that the operations depicted in FIG. 4 function to derive a three-dimensional model of the object of interest and its surroundings. Extrapolation of the captured image provides an estimate of the three-dimensional location of the object 4 relative to the surface of the parking lot 5.

It is noted that all the functions of the computer 25 may be integrated into a single circuit board, or it may comprise a plurality of daughter boards that interface to a motherboard. While the present invention discloses the use of a conventional personal computer that is "customized" to perform the tasks of the present invention, it is understood that alternative processing devices, such as, for example, programmed logic array designed to perform the functions of the present invention, may be substituted without departing from the spirit and/or scope of the invention.

The temporary storage device 27 stores the digital data output from the frame capture device 26. The temporary storage device 27 may be, for example, RAM memory that retains the data stored therein as long as electrical power is supplied to the RAM.

The long-term storage device 28 comprises, for example, a non-volatile memory and/or a disk drive. The long-term storage device 28 stores operating instructions that are executed by the invention to determine the occupancy status of parking space. For example, the storage device 28 stores routines (to be described below) for calibrating the system, and for performing a perspective correction, and 3D mapping.

The display controller 30 comprises, for example, an ASUS model V7100 video card. This card converts the digital computer signals to a format (e.g., RGB, S-Video, and/or composite video) that is compatible with the associated monitor 32. The monitor 32 may be located proximate the computer 25 or may be remotely located from the computer 25.

FIGS. 4(*a*) to 4(*e*) illustrate optical image transformations produced by the stereoscopic camera set 100*a* and 100*b* of FIG. 1, as well as initial image normalization in the electronic domain. In FIG. 4(*a*), the object (e.g. the parking lot 5 and its contents 4) is illustrated as a rectangle with an "X" marking its right half. The marking helps in recognizing the orientation of images. Object 4 is in a skewed plane to the cameras' focal planes, and faces the cameras of FIG. 1. For convenience, the following discussion of FIGS. 4(*b*) to 4(*e*) will refer to "right" and "left". However, it is understood that use of the terminology such as, for example, "left", "right" is simply used to differentiate between plural images produced by the cameras 100*a* and 100*b*.

FIG. 4(*b*) represents an image 200 of the object 4 as seen through a left camera (100*a* in FIG. 1), showing a perspective distortion (e.g., trapezoidal distortion) of the image and maintaining the same orientation ("X" marking on the right half as on the object 4 itself).

FIG. 4(*c*) represents an image 202 of the object 4 as seen through a right camera (100*b* in FIG. 1) showing a perspective distortion (e.g., trapezoidal distortion) and maintaining the original orientation ("X" marking on the right half as on the object 4 itself).

It is noted that in addition to the perspective distortion, additional distortions (not illustrated) may also occur as a result of, but not limited to, for example, an imperfection in the optical elements, and/or an imperfection in the cameras' sensors. The images 204 and 206 must be restored to minimize the distortion effects within the resolution capabilities of the cameras' sensors. The image restoration is done in the electronic and software domains by the computer 25. There are circumstances where the distortions can be tolerated and no special corrections are necessary. This is especially true when the space diversity (the distance between cameras) is small.

According to the present invention, a database is employed to maintain a record of the distortion shift for each pixel of the sensor of each camera for best accuracy attainable. It is understood that in the absence of such database, the present invention will function with uncorrected (e.g. inherent) distortions of each camera. In the disclosed embodiment, the database is created at the time of installation of the system, when the system is initially calibrated, and may be updated each time periodic maintenance of the systems' cameras is performed. However, it is understood that calibration of the system may be performed at any time without departing from the scope and/or spirit of the invention. The information stored in the database is used to perform a restoration process of the two images, if necessary, as will be described below. This database may be stored, for example, in the computer 25 used with the cameras 100*a* and 100*b*.

Image 204 in FIG. 4(*d*) represents a restored version of image 200, derived from the left camera's focal plane sensor, which includes a correction for the above-noted perspective distortion. Similarly, image 206 in FIG. 2(*e*) represents a restored version of image 206, derived from the right camera's focal plane sensor, which includes a correction for the above-noted perspective distortion.

Figure 5:
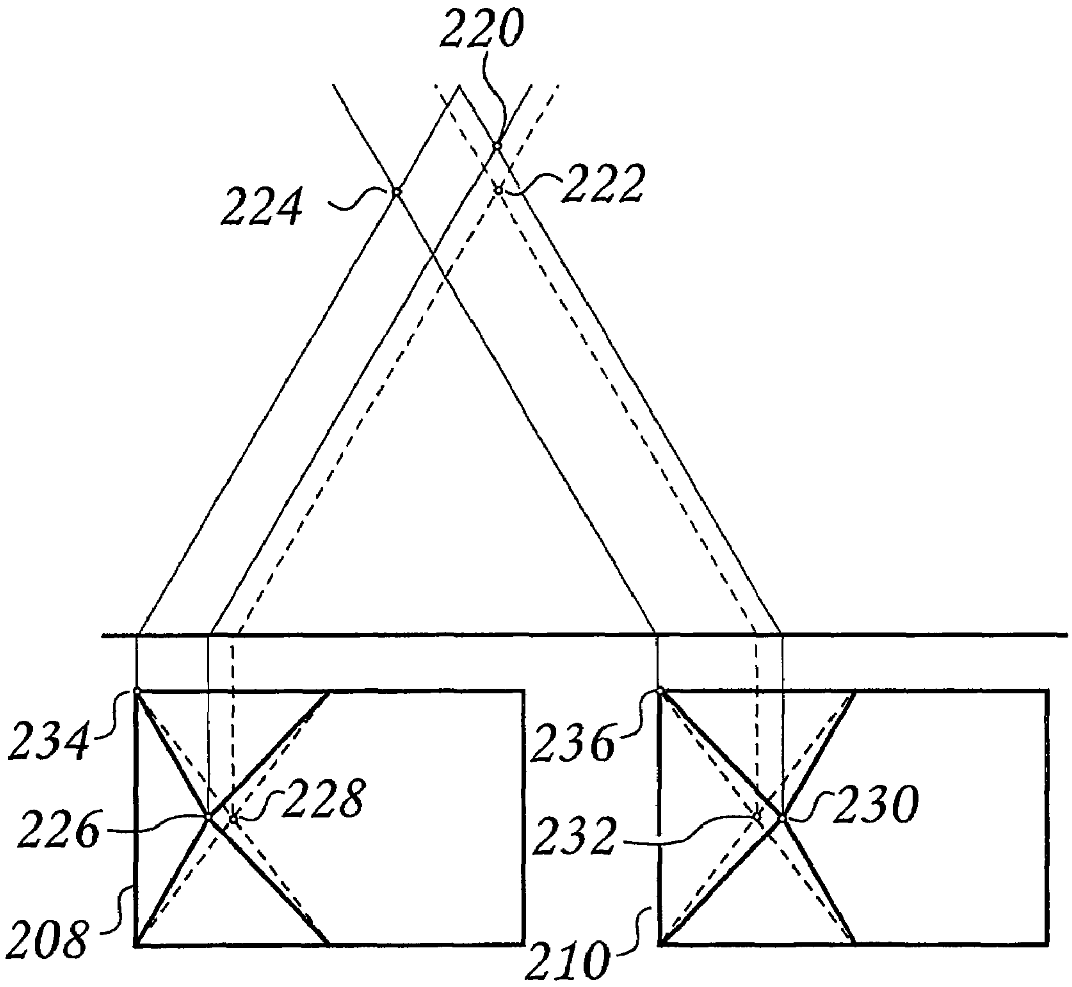
FIG. 5 illustrates an example of a stereoscopic process for three-dimensional mapping to determine the location of each recognizable landmark on both left and right images produced by the capture device of FIG. 1.

FIG. 5 illustrates a stereoscopic process for three-dimensional mapping. Parking lots and parked vehicles generally have irregular, three-dimensional shapes. In order to simplify the following discussion, an explanation is set forth with respect to three points of a concave pyramid (not shown); a tip 220 of the pyramid, a projection 222 of the tip 220 on a base of the pyramid perpendicular to the base, and a corner 224 of the base of the pyramid. The tip 220 points away from the camera (not shown).

Flat image 204 of FIG. 4(*d*) and flat image 206 of FIG. 4(*e*) are shown in FIG. 5 by dotted lines for the object, described earlier, and by solid lines for the stereoscopic images of the three-dimensional object that includes the pyramid. FIG. 5 illustrates the geometrical relationship between the stereoscopic images 204 and 206 of the pyramid and the three-dimensional pyramid defined by the reconstructed tip 220, its projection 222 on the base, and the corner 224 of the base. It is noted that a first image point 226 corresponding to reconstructed tip of the pyramid 220 is shifted to the left with respect to the projection of the tip 228 on the flat object corresponding to the point of the reconstructed projection point 222 of the reconstructed tip 220. Similarly, a second image point 230 corresponding to the reconstructed tip of the pyramid 220 is shifted to the right with respect to a projection point 232 on the flat object corresponding to the reconstructed projection point 222 of the reconstructed tip 220. The image points 234 and 236 corresponding to the corner 224 of the base of the pyramid are not shifted because the corner is part of the pyramid's base.

The first reconstructed point 222 of the reconstructed tip 220 on the base is derived as a cross-section between lines starting at projected points 228 and 232, and is inclined at an angle, as viewed by the left camera 100*a* and the right camera 100*b* respectively. In the same manner, the reconstructed tip 220 is determined from points 226 and 230, whereas a corner point 224 is derived from points 234 and 236. Note that reconstructed points 224 and 222 are on a horizontal line that represent a plane of the pyramid base. It is further noted that reconstructed point 220 is above the horizontal line, indicating a location outside the pyramid base plane on a distant side relative to the cameras. The process of mapping the three-dimensional object is performed in accordance with rules implemented by a computer algorithm executed by the computer. 25. The three-dimensional analysis of a scene is performed by use of static or dynamic images. A static image is obtained from a single frame of each capture device. A dynamic image is obtained as a difference of successive frames of each capture device and is executed when objects of interest are in motion. It is noted that using a dynamic image to perform the three-dimensional analysis results in reduction of "background clutter" and enhances the delineation of moving objects of interest by, for example, subtracting successive frames, one from another, resulting in cancellation of all stationary objects captured in the images.

The present system may be configured to present a visual image of a specific parking lot section being monitored, thus allowing the staff to visually confirm the condition of the parking lot section.

In the disclosed invention, a parking lot customer parking availability notification occupancy display (not shown) comprise distributed displays positioned throughout the parking lot directing drivers to available parking spaces. It is understood that alphanumeric or arrow messages for driver direction, such as, but not limited to, for example, a visual monitor or other optoelectric or electromechanical device, may be employed, either alone or in combination, without departing from the spirit and/or scope of the invention.

The system of the present invention uniquely determines the location of a feature as follows: digital cameras (sometimes in conjunction with frame capture devices) present the image they record to the computer 25 in the form of a rectangular array (raster) of "pixels" (picture elements), such as, for example 640×480 pixels. That is, the large rectangular image is composed of rows and columns of much smaller pixels, with 640 columns of pixels and 480 rows of pixels. A pixel is designated by a pair of integers, $(a_i,b_i)$, that represent a horizontal location "a" and a vertical location "b" in the raster of camera i. Each pixel can be visualized as a tiny light beam emanating from a point at the scene into the sensor (camera) 100*a* or 100*b* in a particular direction. The camera does not "know" where along that beam the "feature" which has been identified is located.

However, when the same feature has been identified by two spatially diverse cameras, the point where the two "beams" from the two cameras cross precisely locates the feature in the three-dimensional space of the monitored parking lot segment. For example, the calibration process (to be described below) determines which pixel addresses (a,b) lie nearest any three-dimensional point (x,y,z) in the monitored space of the parking lot. Whenever a feature on a vehicle is visible in two (or more) cameras, the three-dimensional location of the feature can be obtained by interpolation in the calibration data.

The operations performed by the computer 25 on the data obtained by the cameras will now be described. An initial image view $C^{i,j}$ captured by a camera is processed to obtain a two-dimensional physical perspective representation. The two-dimensional physical perspective representation of the image is transformed via a general metric transformation:

$$P^{i,j} = \sum_{k=1}^{N_X} \sum_{l=1}^{N_Y} g_{k,l}^{i,j} C^{k,l} + h^{i,j}$$

to the "physical" image $P^{i,j}$. In the disclosed embodiment, i and k are indices that range from 1 to $N_x$, where $N_x$ is the number of pixels in a row, and j and l are indices that range from 1 to $N_y$, where $N_y$ is the number of pixels in a column. The transformation from the image view $C^{i,j}$ to the physical image $P^{ij}$ is a linear transformation governed by $g_{k,l}^{i,j}$, which represents both a rotation and a dilation of the image view $C^{i,j}$, and $h^{i,j}$, which represents a displacement of the image view $C^{i,j}$.

A three-dimensional correlation is performed on all observed features which are uniquely identified in both images. For example, if $L^{i,j}$ and $R^{i,j}$ are defined as the left and right physical images of the object under study, respectively, then $$P^{k,l,m} = f^{k,l,m}(L,R)$$

is the three-dimensional physical representation of all uniquely-defined points visible in a feature of the object which can be seen in two cameras, whose images are designated by L and R. The transformation function $f$ is derived by using the physical transformations for the L and R cameras and the physical geometry of the stereo pair derived from the locations of the two cameras.

Figure 6:
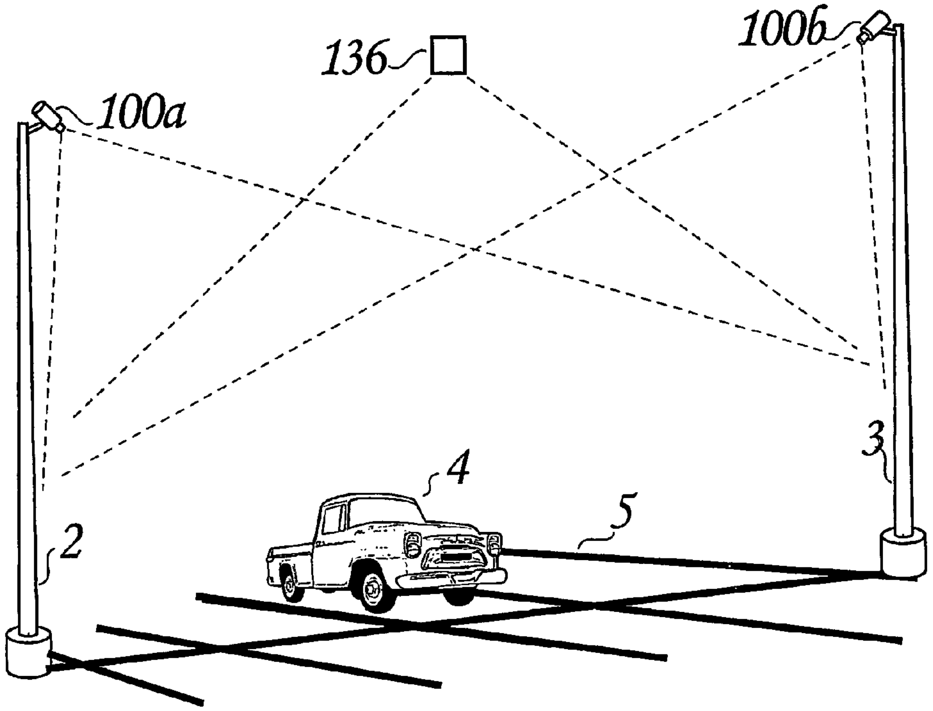
FIG. 6 illustrates a second embodiment of the present invention.

A second embodiment of a camera system used with the present invention is illustrated in FIG. 6. A discussion of the elements that are common to those in FIG. 1 is omitted herein; only those elements that are new will be described.

The second embodiment differs from the first embodiment shown in FIG. 1 by the inclusion of a pattern projector (generator) 136. The pattern projector 136 assists in the stereoscopic object analysis for the three-dimensional mapping of the object. Since the stereoscopic analysis and three-dimensional mapping of the object is based on a shift of each point of the object in the right and left images, it is important to identify each specific object point in both the right and left images. Providing the object with distinct markings often known as fiducials, provides the best references for analytical comparison of the position of each point in the right and left images, respectively.

The second embodiment of the present invention employs the pattern generator 136 to project a pattern of light (or shadows). In the second embodiment, the pattern projector 136 is shown to illuminate the object (vehicle) 4 and parking lot segment 5 from a vantage position of the center between camera 100*a* and 100*b*. However, it is understood that the pattern generator may be located at different positions without departing from the scope and/or spirit of the invention.

The pattern generator 136 projects at least one of a stationary and a moving pattern of light onto the parking lot 5 and the object (vehicle) 4 and all else that are within the view of the cameras 100*a* and 100*b*. The projected pattern is preferably invisible (for example, infrared) light, so long as the cameras can detect the image and/or pattern of light. However, visible light may be used without departing from the scope and/or spirit of the invention. It is noted that the projected pattern is especially useful when the object (vehicle) 4 and/or its surroundings are relatively featureless (parking lot covered by snow), making it difficult to construct a three-dimensional representation of the monitored scene. It is further noted that a moving pattern enhances image processing by the application of dynamic three-dimensional analysis.

Figure 7:
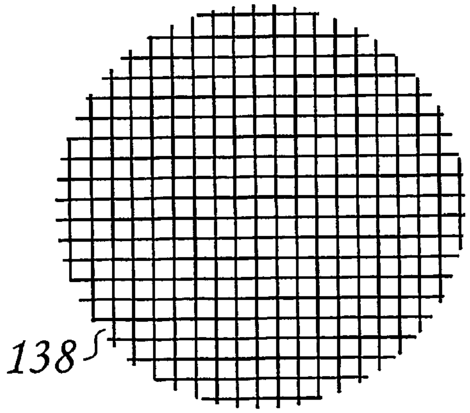
FIG. 7 illustrates a grid form pattern produced by a pattern generator used with the second embodiment of the invention.

FIG. 7 illustrates an example of a grid form pattern 138 projected by the pattern projector 136. It should be appreciated that alternative patterns may be utilized by the present invention without departing from the scope and/or spirit of the invention. For example, the pattern can vary from a plain quadrille grid or a dot pattern to more distinct marks, such as many different small geometrical shapes in an ordered or random pattern.

In the grid form pattern shown in FIG. 7, dark lines are created on an illuminated background. Alternately, if multiple sequences of camera-captured frames are to be analyzed, a moving point of light, such as, for example, a laser scan pattern, can be utilized. In addition, a momentary illumination of the entire area can provide an overall frame of reference.

FIG. 8(*a*) illustrates a left image 140, and FIG. 8(*b*) illustrates a right image 142 of a stereoscopic view of a concave volume produced by the stereoscopic camera 100, along with a distortion 144 and 146 of the grid form pattern 138 on the left and right images 140 and 142, respectively. In particular, it is noted that the distortion 144 and 146 represents a gradual horizontal displacement of the grid form pattern to the left in the left image 140, and a gradual horizontal displacement of the grid form pattern to the right in the right image 142.

A variation of the second embodiment involves using a pattern generator that projects a dynamic (e.g., non-stationary) pattern, such as a raster scan onto the object (vehicle) 4 and the parking lot 5 and all else that is in the view of the cameras 100*a* and 100*b*. The cameras 100*a* and 100*b* capture the reflection of the pattern from the parking lot 5 and the object (vehicle) 4 that enables dynamic image analysis as a result of motion registered by the capture device.

Another variation of the second embodiment is to use a pattern generator that projects uniquely-identifiable patterns, such as, but not limited to, for example, letters, numbers or geometric patterns, possibly in combination with a static or dynamic featureless pattern. This prevents the mislabeling of identification of intersections in stereo pairs, that is, incorrectly correlating an intersection in a stereo pair with one in a second photo of the pair, which is actually displaced one intersection along one of the grid lines.

The operations performed by the computer 25 to determine the status of a parking space will now be described.

Images obtained from camera 100*a* and 100*b* are formatted by the frame capture device 26 to derive parameters that describe the position of the object (vehicle) 4. This data is used to form a database that is stored in either the short-term storage device 27 or the long-term storage device 28 of the computer 25. Optionally, subsequent images are then analyzed in real-time and compared to previous data for changes in order to determine the motion, and/or rate of motion and/or change of orientation of the vehicle 4. This data is used to characterize the status of the vehicle.

For example, a database for the derived parameters may be constructed using a commercially available software program called ACCESS, which is sold by Microsoft. If desired, the raw image may also be stored. One skilled in the art will recognize that any fully-featured database may be used for such storage and retrieval, and thus, the construction and/or operation of the present invention is not to be construed to be limited to the use of Microsoft ACCESS.

Subsequent images are analyzed for changes in position, motion, rate of motion and/or change of orientation of the object. The tracking of the sequences of motion of the vehicle enables dynamic image analysis and provides further optional improvement to the algorithm. The comparison of sequential images (that are, for example, only seconds apart) of moving or standing vehicles can help identify conditions in the parking lot that due to partial obstructions may not be obvious from a static analysis. Furthermore, depending on the image capture rate, the analysis can capture the individuals walking in the parking lot and help monitor their safety or be used for other security and parking lot management purposes. In addition, by forming a long term recording of these sequences, incidents on the parking lot can be played back to provide evidence for the parties in the form of a sequence of events of an occurrence.

For example, when one vehicle drives too close to another vehicle and the door causes a dent in the second vehicle's exterior, or a walling individual is hurt by a vehicle or another individual, such events can be retrieved, step by step, from the recorded data. Thus, the present invention additionally serves as a security device.

A specific software implementation of the present invention will now be described. However, it is understood that variations to the software implementation may be made without departing from the scope and/or spirit of the invention. While the following discussion is provided with respect to the installation of the present invention in one section of a parking lot, it is understood that the invention is applicable to any size or type of parking facility by duplicating the process in other segments. Further, the size or type of the parking lot monitored by the present invention may be more or less than that described below without departing from the scope and/or spirit of the invention.

FIG. 9 illustrates the occupancy detection process that is executed by the present invention. Initially, an Executive Process subroutine is called at step S10. Once this subroutine is completed, processing proceeds to step S12 to determine whether a Configuration Process is to be performed. If the determination is affirmative, processing proceeds to step S14, wherein the Configuration subroutine is called. Once the Configuration subroutine is completed, processing continues at step S16. On the other hand, if the determination at step S12 is negative, processing proceeds from step S12 to S16.

At step S16, a determination is made as to whether a Calibration operation should be performed. If it is desired to calibrate the system, processing proceeds to step S18, wherein the Calibrate subroutine is called, after which, a System Self-test operation (step S20) is called. However, if it is determined that a system calibration is not required, processing proceeds from step S16 to step S20.

Once the System Self-test subroutine is completed, an Occupancy Algorithm subroutine (step S22) is called, before the process returns to step S10.

The above processes and routines are continuously performed while the system is monitoring the parking lot.

Figure 10:
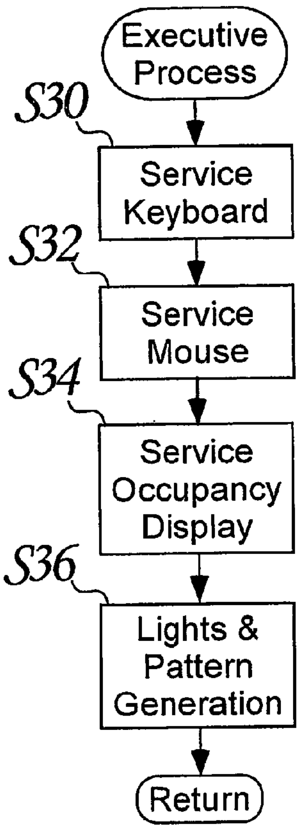
FIG. 10 illustrates an example of an Executive Process subroutine called by the parking space occupancy routine of FIG. 9.

FIG. 10 illustrates the Executive Process subroutine that is called at step S10. Initially, a Keyboard Service process is executed at step S30, which responds to operator input via a keyboard 34 (see FIG. 3) that is attached to the computer 25. Next, a Mouse Service process is executed at step S32, in order to respond to operator input from a mouse 36 (see FIG. 3). At this point, if an occupancy display has been activated, an Occupancy Display Service process is performed (step S34). This process determines whether and when additional occupancy display changes must be executed to insure that they reflect the latest parking lot condition and provide proper guidance to the drivers.

Step S36 is executed when the second embodiment is used. It is understood that the first embodiment does not utilize light patterns that are projected onto the object. Thus, when this subroutine is used with the first embodiment, step S36 is deleted or bypassed (not executed). In this step, projector 136 (FIG. 6) is controlled to generate patterns of light to provide artificial features on the object when the visible features are not sufficient to determine the condition of the object.

When this subroutine is complete, processing returns to the Occupancy Detection Process of FIG. 9.

Figure 11:
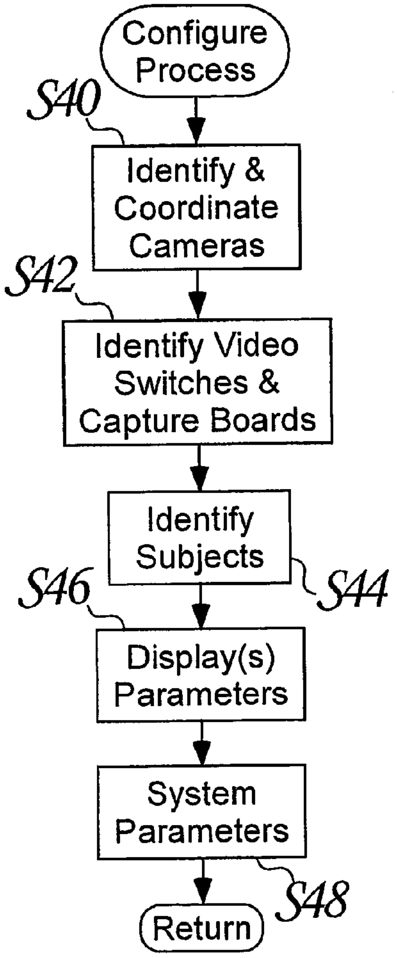
FIG. 11 illustrates an example of a Configure subroutine called by the parking space occupancy routine of FIG. 9.

FIG. 11 illustrates the Configure subroutine that is called at step S14. This subroutine comprises a series of operations, some of which are performed automatically and some of which require operator input. At step S40, the capture device (such as one or more cameras) are identified, along with their coordinates (locations). It is also noted that some cameras may be designed to automatically identify themselves, while other cameras may require identification by the operator. It is noted that this operation to update system information is required only when the camera (or its wiring) is changed.

Step S42 is executed to identify what video switches and capture boards are installed in the computer 25, and to control the cameras (via camera controller 26*a* shown in FIG. 3) and convert their video to computer usable digital form. It is noted that some cameras generate data in a digital form already compatible with computer formats and do not require such conversion. Thereafter, step S44 is executed to inform the system of which segment of the parking lots is to be monitored. Occupancy Display system parameters (step S46) to be associated with the selected parking lot segment is then set. Then, step S48 is executed to input information about the segment of the parking lot to be monitored. Processing then returns to the main routine in FIG. 9.

Figure 12:
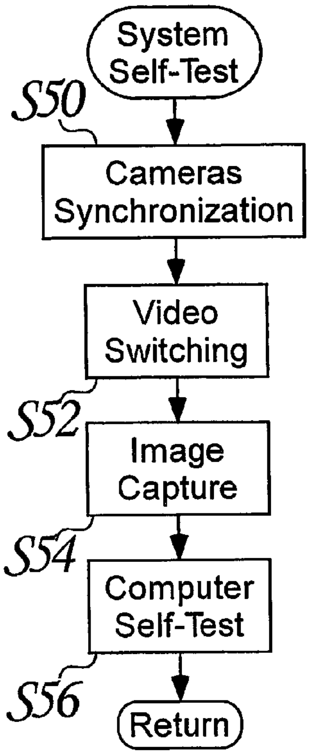
FIG. 12 illustrates an example of a System Self-Test subroutine called by the parking lot occupancy routine of FIG. 9.

FIG. 12 illustrates the operations that are performed when the System Self-test subroutine (step 20) is called. This subroutine begins with a Camera Synchronization operation (step S50), in which the cameras are individually tested, and then, re-tested in concert to insure that they can capture video images of monitored volume(s) with sufficient simultaneity that stereo pairs of images will yield accurate information about the monitored parking lot segment. Next, a Video Switching operation is performed (step S52) to verify that the camera video can be transferred to the computer 25. An Image Capture operation is also performed (step S54) to verify that the images of the monitored volume, as received from the cameras, are of sufficient quality to perform the tasks required of the system. The operation of the computer 25 is then verified (step S56), after which, processing returns to the routine shown in FIG. 9.

Figure 13:
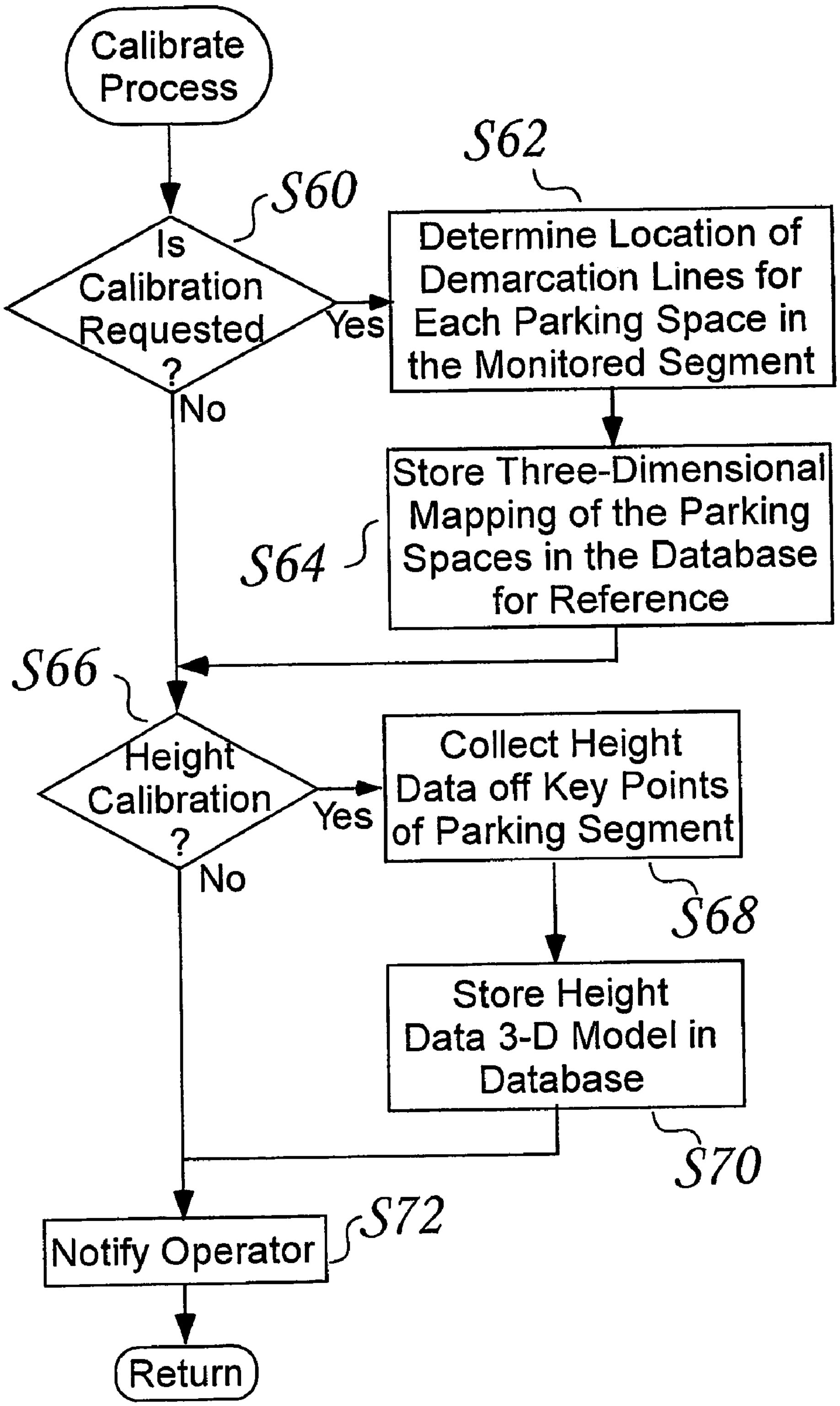
FIG. 13 illustrates an example of a Calibrate subroutine called by the parking space occupancy routine of FIG. 9.

The Calibrate subroutine called at step S18 is illustrated in FIG. 13. In the disclosed embodiments, the calibration operation is performed when the monitored parking lot segment is empty of vehicles. When a calibration is requested by the operator and verified in step S60, the system captures the lines which delineate the parking spaces in the monitored parking lot predetermined area as part of deriving the parking lot parameters. Each segment of demarcation lines between parking spaces is determined and three-dimensionally defined (step S62) and stored as part of a baseline in the database (step S64). It is noted that three-dimensional modeling of a few selected points on the demarcation lines between parking spaces can define the entire demarcation line cluster.

Height calibration is performed when initial installation is completed. When height calibration is requested by the computer operator and verified by step S66, the calibration is performed by collecting height data (step S68) of an individual of known height. The individual walls on a selected path within the monitored parking lot segment while wearing distinctive clothing that contrasts well with the parking lot's surface (e.g., a white hard-hat if the parking lot surface is black asphalt). The height analysis can be performed on dynamic images since the individual target is in motion (dynamic analysis is often considered more reliable than static analysis). In this regard, the results of the static and dynamic analyses may be superimposed (or otherwise combined, if desired). The height data is stored in the database as another part of a baseline for reference (step S70). The height calibration is set to either a predetermined duration, (e.g. two minutes) or by verbal coordination by the computer operator that instructs the height data providing individual to walk through the designated locations on the parking lot until the height is completed.

The calibration data is collected to the nearest pixel of each camera sensor. The camera resolution will therefore have an impact on the accuracy of the calibration data as well as the occupancy detection process.

The operator is notified (step S72) that the calibration process is completed and the calibration data is used to update the system calibration tables. The Calibration subroutine is thus completed, and processing returns to the main program shown in FIG. 9.

Figure 14:
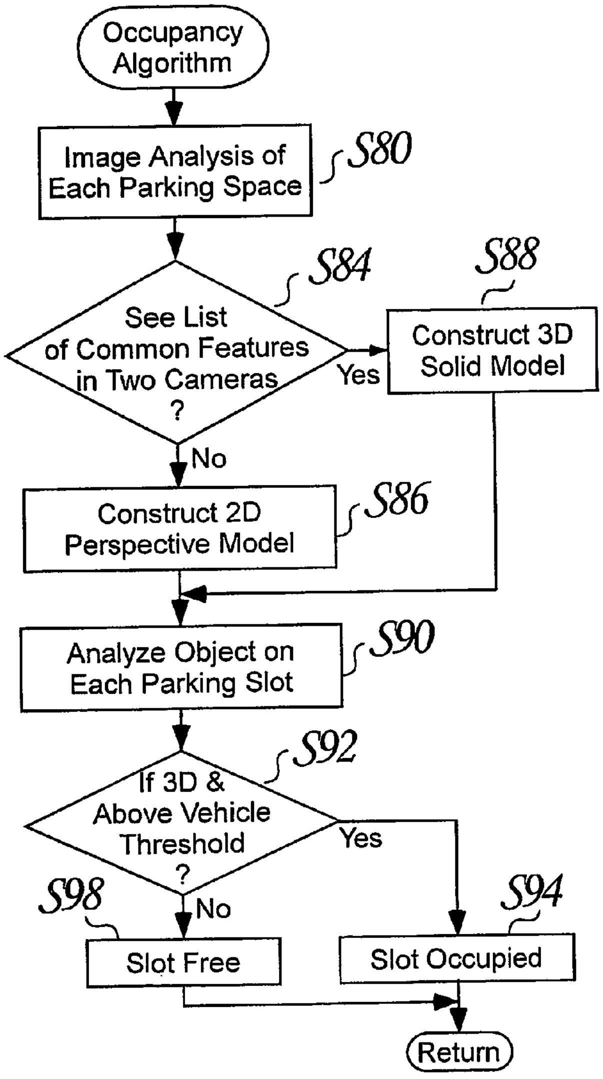
FIG. 14 illustrates an example of an Occupancy Algorithm subroutine called by the parking space occupancy routine of FIG. 9.

FIG. 14 illustrates the Occupancy Algorithm subroutine that is called at step S22. Initially, an Image Analysis subroutine (to be described below) is called at step S80. Image preprocessing methods common in the field of image processing, such as, but not limited to, for example, outlier detection and time-domain integration, are performed to reduce the effects of camera noise, artifacts, and environmental effects (e.g. glare), on subsequent processing. Edge enhancing processes common in the field of image processing, such as, but not limited to, a Canny edge detector, a Sobel detector, or a Marr-Hildreth edge operator, are performed to provide clear delineation between objects in the captured images. For clear delineation of moving objects, dynamic image analysis is utilized. Image analysis data is processed as dynamic analysis when, for example, a vehicle is stationary but wind driven tree branches cast a moving shadow on the vehicle's surface. Since the moving shadows reflected from the vehicle's surface are registered by the capture device as moving objects, they are suitable for dynamic analysis. Briefly, the image analysis subroutine creates a list for each camera, in which the list contains data of: objects and feature(s) on the monitored parking lot segment for each camera. Once the lists are created, processing resumes at step S84, where common elements (features) seen by two cameras are determined. For each camera that sees each list element, a determination is made as to whether only one camera sees the feature or whether two cameras see the feature. If only one camera sees the feature, a two-dimensional model is constructed (step S86). The two-dimensional model estimates where the feature would be on the parking lot surface, and where it would be if the vehicle was parked at a given parking space.

However, if more than one camera sees the feature, the three-dimensional location of the feature is determined at step S88. Correlation between common features in images of more than one camera can be performed directly or by transform function (such as Fast Fourier Transform) of a feature being correlated. Other transform functions may be employed for enhanced common feature correlation without departing from the scope and/or spirit of the instant invention. It is noted that steps S84, S86 and S88 are repeated for each camera that sees the list element. It is also noted that once a predetermined number of three-dimensional correlated features of two camera images are determined to be above a predetermined occupancy threshold of a given parking space, that parking space is deemed to be occupied and no further feature analysis is required.

Both the two-dimensional model and the three-dimensional model assemble the best estimate of where the vehicle is relative to the parking area surface, and where any unknown objects are relative to the parking area surface (step S90) at each parking space. Then, at step S92, the objects for which a three-dimensional model is available are tested. If the model places the object close enough to the parking lot surface to be below a predetermined occupancy threshold, an available flag is set (step S94) to set the occupancy displays.

Figure 15:
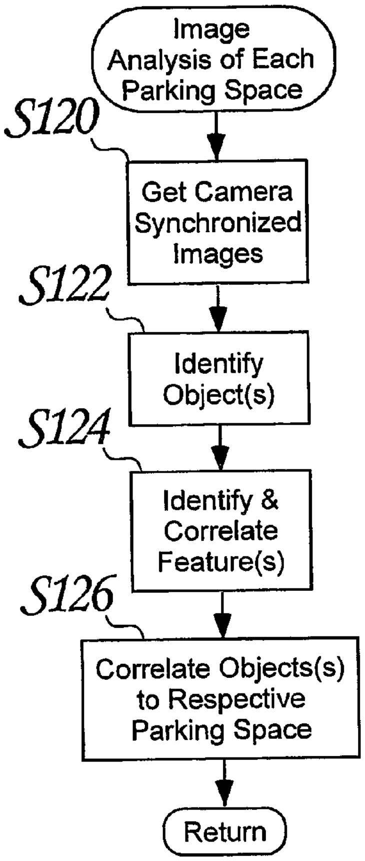
FIG. 15 illustrates an example of an Image Analysis subroutine called by the parking space occupancy detection routine of FIG. 14.

FIG. 15 illustrates the Image Analysis subroutine that is called at step S80. As previously noted, this subroutine creates a list for each camera, in which the list contains data of objects and feature(s) on the monitored parking lot segment for each camera. Specifically, step S120 is executed to obtain camera images in real-time (or near real-time). Three-dimensional models of the monitored object is maintained in the temporary storage device (e.g., RAM) 27 of the computer 25. Then, an operation to identify the object is initiated (step S122). In the disclosed embodiments, this is accomplished by noting features on the object 4 and determining whether they are found and are different from the referenced empty parking lot segment (as stored in the database). If they are found, the three-dimensional model is updated. However, if only one camera presently sees the object, a two-dimensional model is constructed. Note that the two-dimensional model will rarely be utilized if the camera placement ensures that each feature is observed by more than one camera.

According to the above discussion, the indicating device provides an indication of the availability of at least one available parking space (that is, an indication of empty parking spaces are provided). However, it is understood that the present invention may alternatively provide an indication of which parking space(s) are occupied. Still further, the present invention may provide an indication of which parking space(s) is (are) available for parking and which parking space(s) is (are) unavailable for parking.

The present invention may be utilized for parking lot management functions. These functions include, but are not limited to, for example, ensuring the proper utilization of handicapped parking spaces, the scheduling of shuttle transportation, and for determining the speed at which the vehicles travel in the parking lot. The availability of handicapped spaces may be periodically adjusted according to statistical evidence of their usage, as derived from the occupancy data (status). Shuttle transportation may be effectively scheduled based on the number of passengers recorded by the three-dimensional model (near real-time) at a shuttle stop. The scheduling may, for example, be determined based, for example, on the amount of time individual's wait at a shuttle stop. Vehicle speed control, can be determined, for example, by a dynamic image analysis of a traveled area of the parking lot. Dynamic image analysis determines the velocity of movement at each monitored location.

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims. The invention described herein comprises dedicated hardware implementations including, but not limited to, application specific integrated circuits, programmable logic arrays and other hardware devices constructed to implement the invention described herein. However, it is understood that alternative software implementations including, but not limited to, distributed processing, distributed switching, or component/object distributed processing, parallel processing, or virtual machine processing can also be constructed to implement the invention described herein.

We claim:

1. A method for analyzing a status of at least one predetermined area of a facility, comprising:

- projecting a distinctive marking into at least one predetermined area of the facility;
- establishing a baseline by performing an identification procedure on the facility at a predetermined time;
- capturing an image of at least one predetermined area of the facility;
- producing a three-dimensional model by processing the captured image; and
- indicating the status of the at least one predetermined area based upon a comparison of the three-dimensional model to the baseline.

2. The method of claim 1, wherein producing a three-dimensional model further comprises processing the captured image using at least one of a static image process and a dynamic image process.

3. The method of claim 1, wherein indicating the status comprises updating a status display.

4. The method of claim 1, wherein capturing a synchronized image comprises capturing an image with a plurality of sensors.

5. The method of claim 1, wherein capturing a synchronized image comprises capturing an image with a sensor in conjunction with a controllable directional illuminator.

6. The method of claim 1, wherein capturing an image comprises capturing an image with at least one of a direction controlled range-finder and a three-dimensional sensor.

7. The method of claim 1, wherein processing a captured image comprises producing a determination of at least one of a proximity and an orientation of objects in the at least one predetermined area.

8. The method of claim 1, further comprising at least one of recording the captured image and playing back the captured image.

9. An apparatus for monitoring a presence of an object in a predetermined space in a parking lot, comprising:

- a projecting device that projects a marking into at least one predetermined area of the parking lot;
- an image capture device that captures an image representing a predetermined space in the parking lot;
- a processor that processes said captured image to produce a three-dimensional model of said captured image, said processor analyzing said three-dimensional model to determine an occupancy condition corresponding to at least one of an empty parking space and an occupied parking space; and
- a notification device that provides a notification in accordance with said determined occupancy condition.

10. The apparatus of claim 9, wherein said captured image is processed as at least one of a static image and a dynamic image.

11. The apparatus of claim 9, further comprising a reporting device that provides at least one of a numerical report and a graphical report of a status of said predetermined space in the parking lot.

12. The apparatus of claim 9, wherein said image capture device comprises a plurality of sensors.

13. The apparatus of claim 9, wherein said image capture device comprises a sensor in conjunction with a directional illuminator.

14. The apparatus of claim 9, wherein said image capture device comprises at least one of a directional range-finder sensor and a three-dimensional sensor.

15. The apparatus of claim 9, further comprising a visual display device that provides at least one of a visual representation of the predetermined space and said notification of said occupancy condition.

16. The apparatus of claim 9, wherein said processor determines at least one of a proximity nd an orientation of objects within said predetermined space.

17. The apparatus of claim 9, further comprising a recorder that at least one of records said captured image and plays back said captured image.

18. A method for monitoring a predetermined space in a parking lot, comprising:

- projecting a marking into at least one predetermined area of the parking lot;
- capturing an image of a predetermined space of the parking lot;
- processing the captured image to produce a three-dimensional model of the captured image;
- analyzing the three dimensional model to determine an occupancy status of the predetermined space; and
- providing a notification when said occupancy status indicates an existence of an unoccupied parking space.

19. The method of claim 18, further comprising providing at least one of a numerical report and a graphical report of a status of the predetermined space in accordance with said parking lot.

20. The method of claim 18, wherein capturing an image comprises capturing an image with a sensor in conjunction with a controllable directional illuminator.

21. The method of claim 18, wherein capturing an image comprises capturing an image with at least one of a directional range-finder sensor and a three-dimensional sensor.

22. The method of claim 20, wherein capturing an image comprises using a plurality of sensors to capture an image of the predetermined space.

23. The method of claim 20, further comprising utilizing the three-dimensional model to perform a parking lot management operation.

24. The method of claim 1, wherein projecting a marking comprises using a pattern generator to project the distinctive marking at a predetermined wavelength.

* * * * *